(12) United States Patent
Chen et al.

(10) Patent No.: US 7,323,926 B2
(45) Date of Patent: Jan. 29, 2008

(54) CHARGE PUMP CIRCUIT

(75) Inventors: Kuan-Yeu Chen, Hsinchu (TW); Yi-Ti Wang, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 32 days.

(21) Appl. No.: 11/018,390

(22) Filed: Dec. 21, 2004

(65) Prior Publication Data

US 2006/0132219 A1 Jun. 22, 2006

(51) Int. Cl.
*G05F 3/24* (2006.01)
(52) U.S. Cl. .................... 327/536; 327/537; 363/60
(58) Field of Classification Search .................... None
See application file for complete search history.

(56) References Cited

U.S. PATENT DOCUMENTS

| | | | |
|---|---|---|---|
| 5,754,476 A | 5/1998 | Caser et al. | |
| 6,064,251 A * | 5/2000 | Park | 327/536 |
| 6,255,896 B1 * | 7/2001 | Li et al. | 327/536 |
| 6,373,324 B2 | 4/2002 | Li et al. | |
| 6,614,699 B2 * | 9/2003 | Tanzawa | 365/189.11 |
| 6,621,326 B1 | 9/2003 | Le | |
| 6,912,159 B2 * | 6/2005 | Osawa et al. | 365/185.18 |

* cited by examiner

*Primary Examiner*—Kenneth B. Wells
*Assistant Examiner*—Terry L. Englund
(74) *Attorney, Agent, or Firm*—Knobbe, Martens, Olson & Bear, LLP

(57) ABSTRACT

A charge pump circuit comprises a first pump stage, including a first sub-pump coupled to a first pre-charge MOSFET transistor, wherein the first sub-pump is used to pump down a gate of the first pre-charge MOSFET transistor to thereby increase the pre-charge efficiency of the first pre-charge MOSFET transistor. The higher efficiency the pre-charge MOSFET is, the lower the gate level of a pass transistor is. Thus, the charge sharing efficiency becomes better, and the body effect will be eliminated. The following pump stage is the same as the first pump stage. In addition, this pre-charging is implemented by PMOSFET only; therefore, only a single well is needed and then a small layout area can be achieved. Consequently, a high efficiency negative pump can be obtained.

16 Claims, 4 Drawing Sheets

CHARGE PUMP CIRCUIT

BACKGROUND OF THE INVENTION

1. Field of the Invention

The present invention relates to integrated circuits and, in particular, to charge pump circuits used in integrated circuits.

2. Description of the Related Art

In some integrated circuits, it is desirable to have a circuit that provides a relatively high negative voltage. This is particularly true for integrated circuits that include memory devices, such as, for example, electrically erasable programmable read-only-memory (EEPROM) devices. The high negative voltage is applied to control gates of memory cells during erasure to erase the data stored in the memory cells.

Disadvantageously, many conventional circuits suffer from significant body-effect, which modulates a transistor threshold voltage when the voltage between the bulk and the source is not zero. For example, the body effect can cause the effective threshold voltages of the capacitor-connected MOSFET transistors in one or more pump stages to increase. Because the clock signals have small amplitudes, the body effect can cause transistor conductance to decrease. As transistor conduction decreases, the affected pump stages can become more resistive, which can disadvantageously limit current and adversely affect the charge pump efficiency.

While attempts have been made to reduce the body effect, using certain techniques, the gate of pre-charge MOSFET is insufficiently negative enough, and the pre-charge efficiency is relatively low.

SUMMARY OF THE INVENTION

The present invention relates to charge pump circuits used in integrated circuits, such as FLASH/EEPROM memory circuits. For example, the charge pump can be a PMOS negative pump circuit used to generate a negative voltage. In one example embodiment, a circuit reduces the body effect influence, which is typically present in a PMOS negative pump circuit, by using a sub-pump to increase pre-charge efficiency. In particular, the gate of the pre-charge MOSFET is pumped down to a very negative level. The charge pump efficiency is thereby improved.

One example embodiment provides a charge pump circuit, comprising: a first pump stage, including a first sub-pump coupled to a first pre-charge MOSFET transistor, wherein the first sub-pump is used to pump down a gate of the first pre-charge MOSFET transistor to thereby increase the pre-charge efficiency of the first pre-charge MOSFET transistor; and a second pump stage coupled to the first pump stage, the second pump stage including a second sub-pump coupled to a second pre-charge MOSFET transistor, wherein the second sub-pump is used to pump down a gate of the second pre-charge MOSFET transistor to thereby increase the pre-charge efficiency of the second pre-charge MOSFET transistor.

Another example embodiment provided a charge pump circuit, comprising: a pre-charge transistor having a source, a gate, and a drain; a discharge transistor coupled to the gate of the pre-charge transistor, wherein the discharge transistor selectively discharges the pre-charge transistor; a pass transistor coupled to the source of the pre-charge transistor; and an initialization transistor coupled to the pass transistor, wherein the initialization transistor initializes the drain of the pass transistor.

Still another example embodiment provides memory device, comprising: non-volatile memory cells; a charge pump coupled to the memory cells to erase the memory cells, the charge pump comprising: a pre-charge transistor having a source, a gate, and a drain; a discharge transistor coupled to the gate of the pre-charge transistor, wherein the discharge transistor selectively discharges the pre-charge transistor; a pass transistor coupled to the source of the pre-charge transistor; and an initialization transistor coupled to the pass transistor, wherein the initialization transistor initializes the drain of the pass transistor.

In one embodiment, the circuit is implemented using a small layout in a single N-well, although other embodiments can be implemented in multiple wells or otherwise.

DETAILED DESCRIPTION OF PREFERRED EMBODIMENTS

The present invention relates to charge pump circuits used in integrated circuits, such as FLASH/EEPROM memory circuits. For example, the charge pump can be a PMOS negative pump circuit used to generate a relatively high negative voltage that can be applied to memory cell control gates to erase memory cell data. In one embodiment, a circuit reduces the body effect influence, which is typically present in a PMOS negative pump circuit, by using a sub-pump to increase pre-charge efficiency. In particular, the gate of the pre-charge MOSFET is pumped down to relatively very negative level. The charge pump efficiency is thereby improved.

Figure 1A:
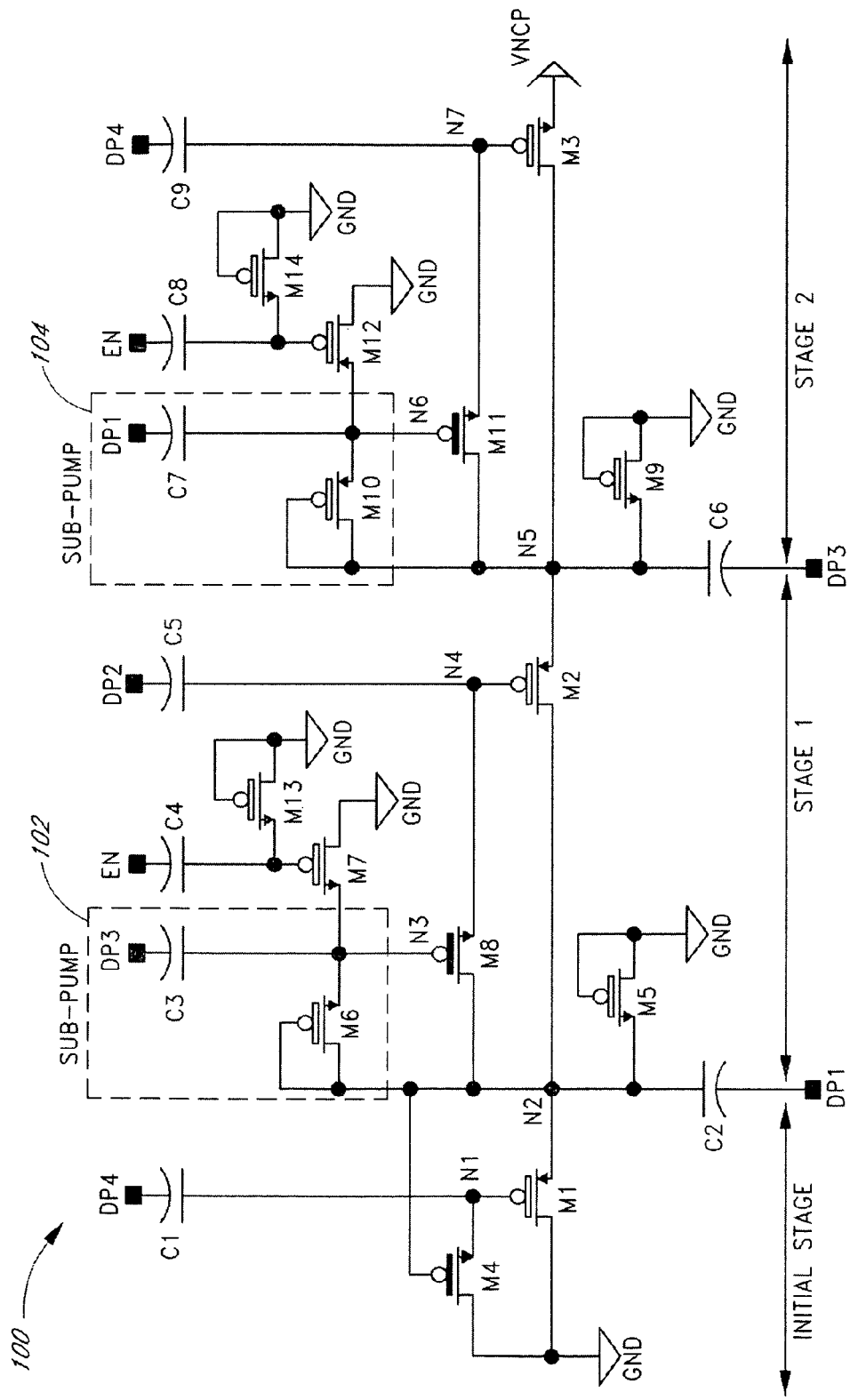
FIGS. 1A-B illustrate an example pump circuit and a clock timing diagram.
Figure 1B:
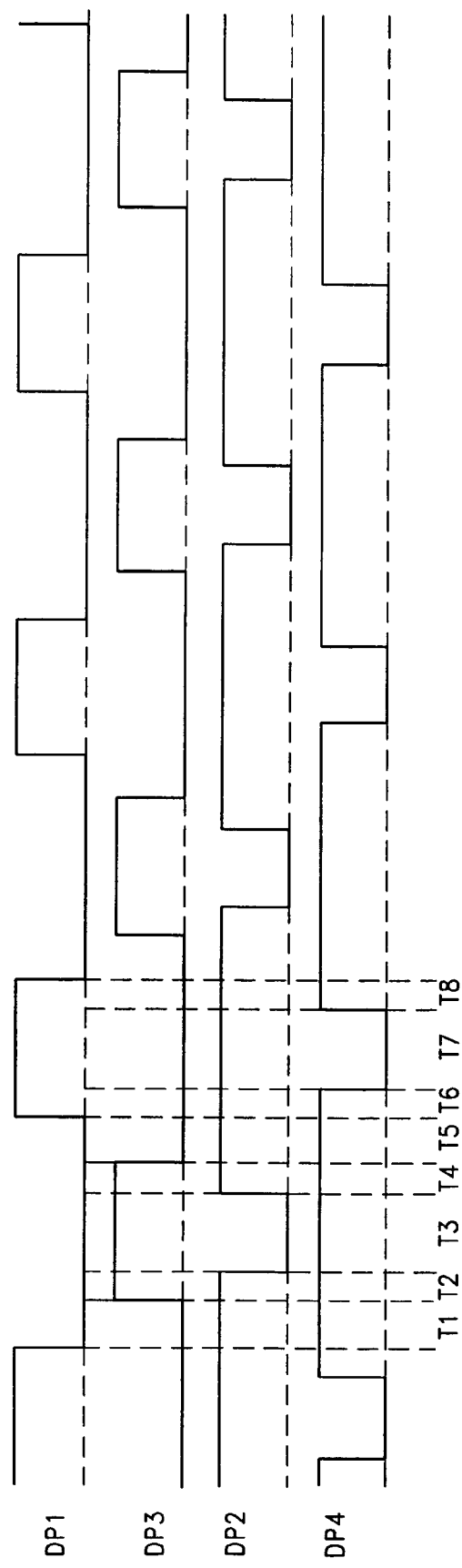
Figure 2:
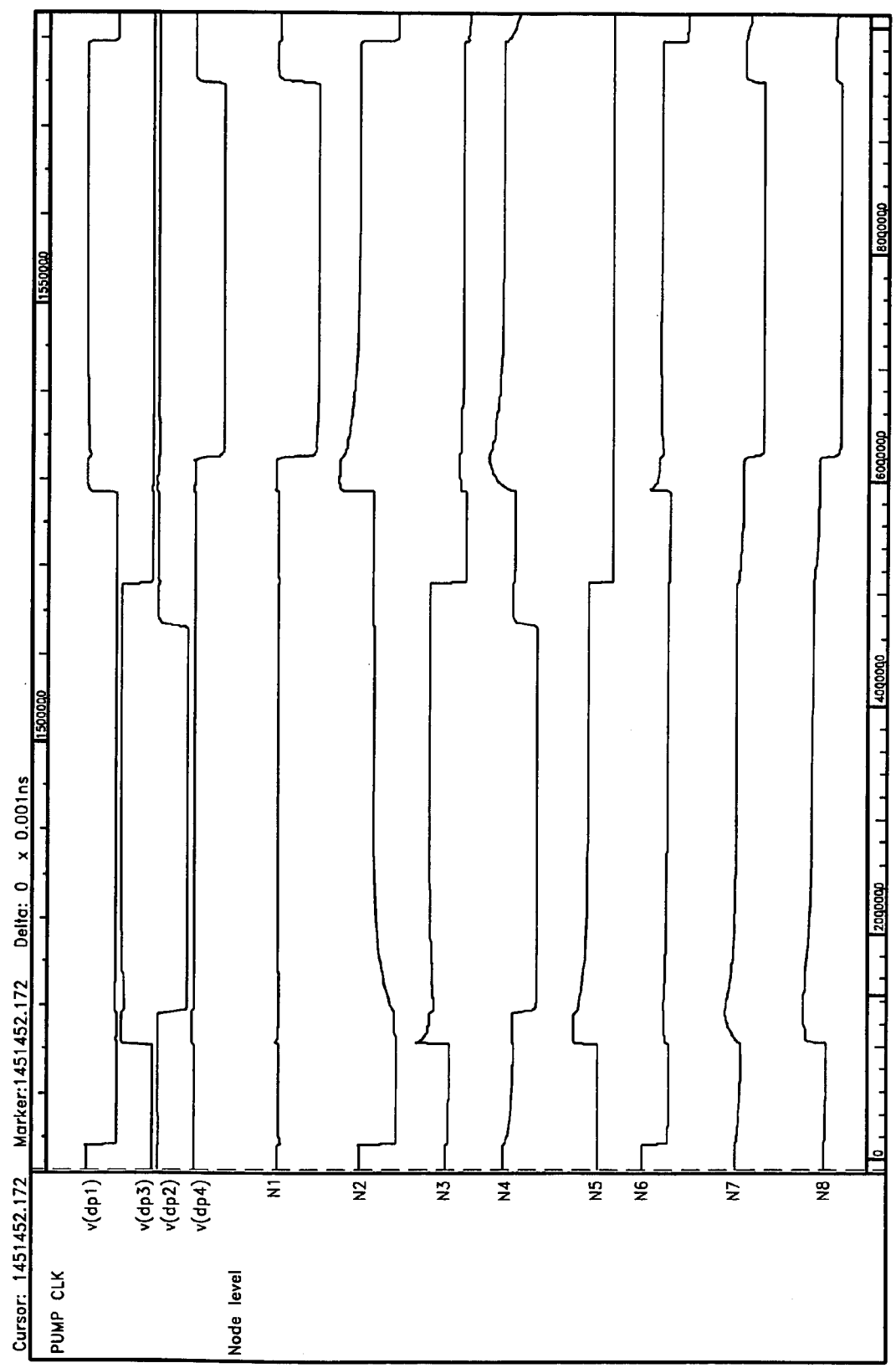
FIGS. 2 and 3 illustrate example actual plots of charge pump clock and node voltages as a function to time.
Figure 3:
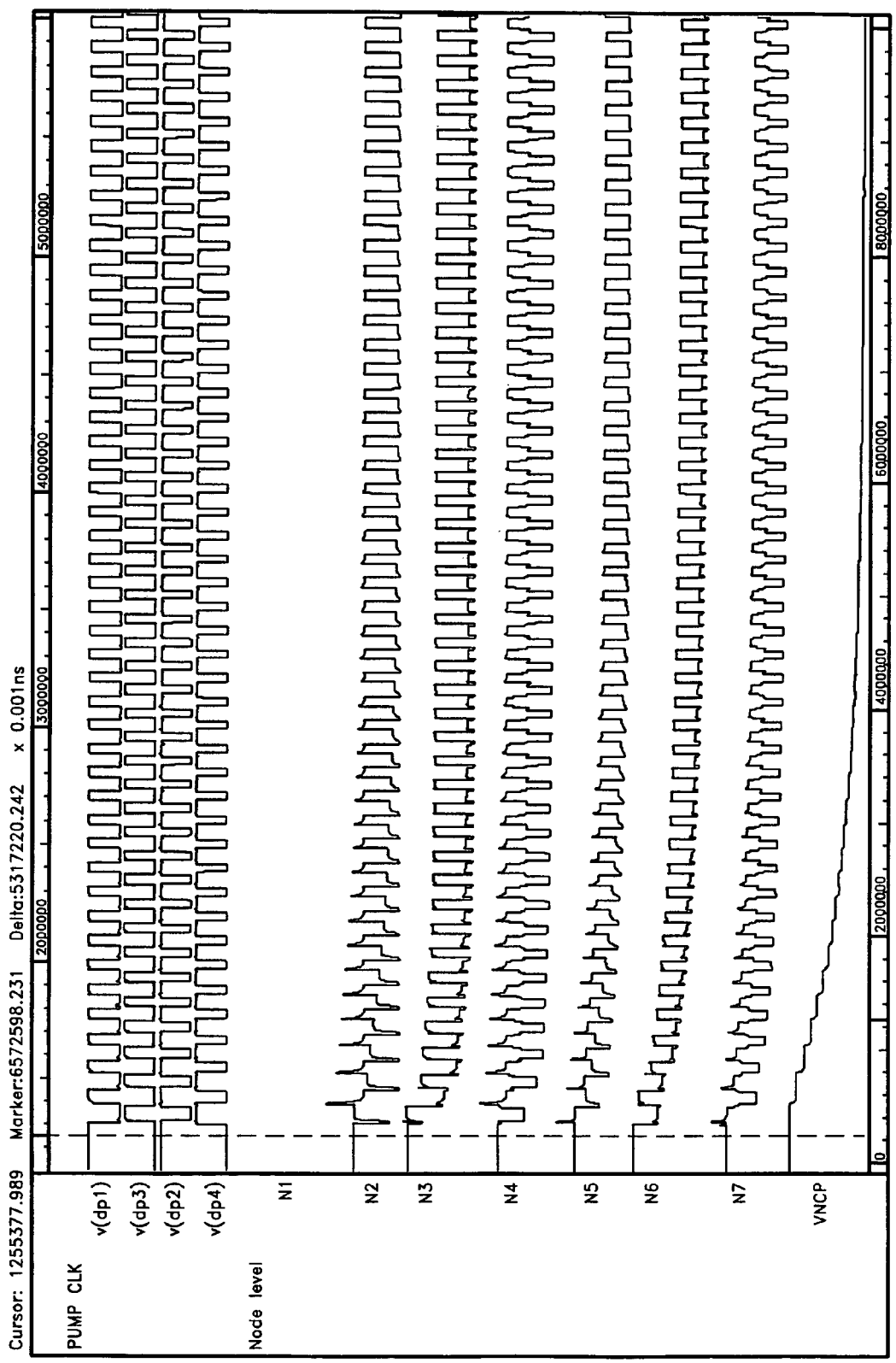

FIG. 1A illustrates an example embodiment of a P channel charge pump circuit 100. In this example, the illustrated transistors are MOSFETs. The example circuit 100 includes three stages, although other embodiments can include fewer or more stages, such as five, seven, nine, or still additional stages. For example, more stages can be connected together to generate a more negative voltage. In this example, the circuit includes an initial stage, a stage 1, and a stage 2. As will be described in greater detail herein, Stage 1 includes a sub-pump 102 and a pre-charge MOSFET transistor M8. Likewise, stage 2 includes a sub-pump 104 and a pre-charge MOSFET transistor M11. The sub-pump is used to pump down the gate of the corresponding pre-charge MOSFET transistor to thereby increase the pre-charge efficiency.

The inputs to the P-channel charge pump circuit 100 include a four phase clock, including clock signals DP1, DP2, DP3, and DP4. In one embodiment, the clock signals DP1, DP2, DP3, and DP4 periodically alternate between ground and approximately a supply voltage, which for example can be 1.8 volts, 3.3 volts, or other voltages.

Referring to FIG. 1A, transistors M1 (in the initial stage), M2 (in stage 1), and M3 (in stage 2) are pass transistors. Transistors M4 (in the initial stage), M8 (in stage 1), and M11 (in stage 2) are pre-charge transistors. Transistors M6 and M10 are configured to act as diodes and are used to correspondingly keep Node 3 (including the gate of transistor M8) and Node N6 (including the gate of transistor M11) at a negative voltage level.

Transistors M5 (in stage 1) and M9 (in stage 2) are initialization transistors that have their gate and source coupled together. The initialization transistors M5 and M9 correspondingly initialize the N2 and N5 under a transistor threshold voltage above ground. Transistors M7 (in stage 1) and M12 (in stage 2) are discharge transistors.

In particular, in this example clock signal DP4 is capacitor coupled via capacitor C1 to the gate of pass transistor M1 and the drain of pre-charge transistor M4 (node N1). The sources of pass transistor M1 and pre-charge transistor M4 are coupled to ground.

Node N2 connects the drain of pass transistor M1, the source of pass transistor M2, the gate of pre-charge transistor M4, the drain of initialization transistor M5, the source and gate of transistor M6, and the clock signal DP1 via capacitor C2.

Node N3 connects the gate of pre-charge transistor M8, the drain of transistor M6, drain of discharge transistor M7, and clock signal DP3 via capacitor C3. The gate of discharge capacitor M7 is capacitor coupled to the enable signal EN via capacitor C4, and is coupled to ground via transistor M13, which is configured as a diode.

Node N4 connects the gate of pass transistor M2, the drain of pre-charge transistor M8, and is capacitor coupled to clock signal DP2 via capacitor C5.

Node N5 connects the drain of pass transistor M2, the source of pass transistor M3, the drain of initialization transistor M9, the source and gate of transistor M10, and the clock signal DP3 via capacitor C6.

Node 6 connects the gate of pre-charge transistor M11, the drain of transistor M10, the drain of discharge transistor M12, and clock signal DP1 via capacitor C7.

The gate of discharge capacitor M12 is capacitor coupled to the enable signal EN via capacitor C8, and is coupled to ground via transistor M14, which is configured as a diode.

Node N7 connects the gate of pass transistor M3, the drain of pre-charge transistor M11, and is capacitor coupled to clock signal DP4 via capacitor C9.

The drain of pass transistor M3 is connected to the negative charge pump output signal VNCP, which can be, by way of example, −2 volts for a two stage negative charge pump, although other voltages can be used.

With reference to FIGS. 1A-1B, and FIGS. 2 and 3, which illustrate example actual plots of charge pump clock and node voltages as a function of time, circuit 100 and the timing signals for clock signals DP1, DP2, DP3, and DP4, the circuit operation will now be described in greater detail. In this example, the charge pump circuit timing can be divided into 8 regions T1 to T8.

When enable signal EN goes low, the transistors M7 and M12 will correspondingly discharge pre-charge transistors M8 and M11 to ground.

Then, at time period T1:

Assuming that the state of clock DP3 is low from a prior state, the voltage at node N5 is at negative level. When clock DP1 transitions from a high level to a low level at T1, nodes N2 and N6 are gradually pulled or pumped down to a negative level.

Node N4 discharges gradually to the voltage at node N3 plus the threshold voltage of pre-charge transistor M8 (VN4=VN3+VT(M8)), and the pre-charge transistor M8 turns off.

Pre-charge transistors M4 and M11 turn on as a result of the negative voltage at nodes N2 and N6, and pass transistors M1 and M3 turn off.

At time period T2:

Clock DP3 transitions from low to high, and the voltages of nodes N3 and N5 are correspondingly boosted up. The voltage of node N3 discharges gradually to the voltage of node N2 plus the threshold voltage of transistor M6 (VN3=VN2+VT(M6)), thereby operating as a sub-negative pump.

At this time, transistor pre-charge transistor M8 is turned off, and the voltage at node N4 will remain at the previous level (VN4=VN3+VT(M8)).

As a result of pre-charge transistor M11 being on, the voltage at node N7 is equal to the voltage at node N5, and so pass transistor M3 is off.

Similarly, as a result of pre-charge transistor M4 being on, pass transistor M1 is off.

At time period T3:

Clock DP2 transitions from high to low.

At this time, the voltage at N4 is pulled or pumped down gradually to a more negative level.

As a result of the more negative voltage at N4, pass transistor M2 turns on fully, and charge flows from node N5 to node N2.

During time T3, pass transistors M1 and M3 remain off.

The voltage at node N5 is equal to the voltage at node N2 after charge distribution and the body effect influence is small and can be ignored. The Vt vs. Vsb can be approximated via the following formula: $Vt=Vt0+r(\sqrt{2\phi f+Vsb}-\sqrt{2\phi f})$, where the $r\approx 0.6, 2\phi f=0.65$. Therefore, a Vt for Vsb=0 and for Vsb=6v, the $\Delta Vt\approx 1V$}.

At time period T4:

Clock DP2 transitions from low to high.

At this time, the voltage at node N4 is pulled up to the level at time T2 (VN4=VN3+VT(M8)). Pass transistor M2 turns off, and pass transistors M1 and M3 remain off.

At time period T5:

Clock DP3 transitions from high to low, pulling nodes N5 and N3 down to the lowest voltage level.

At this time, pre-charge transistor M8 will turn on, and then the voltage at node N4 will be equal to the voltage at node N2. Pass transistor M2 then turns off. The voltage at node N6 is pulled down to the voltage at node N5 plus the threshold voltage of transistor M10 (VN6=VN5+VT(M10). The voltage at node N7 is pulled down to the voltage at node N6 plus the threshold voltage of the pre-charge transistor M11 (VN7=VN6+VT(M11)).

At time period T6:

Clock signal DP1 transitions from low to high, boosting upwards the voltages at nodes N2 and N6. Additionally, the voltage at node N6 discharges to the voltage at node N5 plus the threshold voltage of transistor M10 (VN6=VN5+VT(M10)), thereby acting as a sub-negative pump.

At this time, pre-charge transistor M4 will turn on, and N1 is at ground.

Pre-charge transistor M11 turns off, and the voltage of node N7 remains at the same voltage level as at time T5 (VN6+VT(M11)). Pre-charge transistor M8 turns on, therefore pass transistor M2 turns off.

At time period T7:

Clock signal DP4 transitions from high to low.

At this time, nodes N1 and N7 are pulled down to a more negative level, and pass transistors M1 and M3 fully turn on. Because the voltage at node N4 is equal to the voltage of node N2, transistor M2 is turned off. After charge sharing, the node N2 voltage is equal to ground, and the voltage of node VNCP is equal to the voltage of node N5. The influence of body effect is not significant, as similarly described above.

At time period T8:

Clock signal DP4 transitions from low to high. At this time, nodes N1 and N7 are pulled up to about the same voltage level at time period T6. Pre-charge transistor M8 turns on, and pass transistor M2 remains off.

In one embodiment, the circuit is implemented using a small layout in a single N-well, although other embodiments can be implemented in multiple wells or otherwise. For example, in an NMOS charge pump, which needs to separate the well of the transistor, the size is approximate twice that of a PMOS charge pump, which can use single well.

It should be understood that certain variations and modifications of this invention would suggest themselves to one of ordinary skill in the art. The scope of the present invention is not to be limited by the illustrations or the foregoing descriptions thereof.

What is claimed is:

1. A charge pump circuit, comprising:
    a first pump stage, including a first sub-pump coupled to a first pre-charge MOSFET transistor, wherein the first sub-pump is used to pull down a gate of the first pre-charge MOSFET transistor to a first sub-negative voltage while the first pre-charge MOSFET transistor is off to thereby increase pre-charge efficiency of the first pre-charge MOSFET transistor; and
    a second pump stage coupled to the first pump stage, the second pump stage including a second sub-pump coupled to a second pre-charge MOSFET transistor, wherein the second sub-pump is used to pull down a gate of the second pre-charge MOSFET transistor to a second sub-negative voltage while the first pre-charge MOSFET transistor is off to thereby increase pre-charge efficiency of the second pre-charge MOSFET transistor.

2. The charge pump circuit as defined in claim 1, further comprising:
    a first discharge transistor coupled to the gate of the first pre-charge transistor; and
    a second discharge transistor coupled to the gate of the second pre-charge transistor.

3. The charge pump circuit as defined in claim 1, further comprising a discharge transistor having a source coupled to ground, a drain coupled to the gate of the first pre-charge MOSFET transistor, and a gate capacitor coupled to a control signal, wherein activation of the control signal causes the discharge transistor to discharge the first pre-charge MOSFET transistor.

4. The charge pump circuit as defined in claim 1, further comprising:
    a first pass transistor coupled to the first pre-charge MOSFET transistor;
    a first initialization transistor coupled to the first pass transistor, wherein the first initialization transistor initializes a drain of the first pass transistor;
    a second pass transistor coupled to the second pre-charge MOSFET transistor; and
    a second initialization transistor coupled to the second pass transistor, wherein the second initialization transistor initializes a drain of the second pass transistor.

5. The charge pump circuit as defined in claim 1, further comprising:
    a first clock signal;
    a first capacitor coupled between the first clock signal and the gate of the first pre-charge transistor;
    a second clock signal; and
    a second capacitor coupled between the second clock signal and the gate of the second pre-charge transistor.

6. The charge pump circuit as defined in claim 5, further comprising an initial stage including a pass transistor having a source coupled to ground, a drain coupled to the source of the first pre-charge MOSFET transistor, and a gate capacitor coupled to a third clock signal.

7. The charge pump circuit as defined in claim 4, further comprising a negative charge pump output signal coupled to the second pass transistor.

8. A charge pump circuit, comprising:
    a precharge transistor having a source, a gate, and a drain;
    a discharge transistor coupled to the gate of the pre-charge transistor, wherein the discharge transistor selectively discharges the pre-charge transistor;
    a pass transistor coupled to the source of the pre-charge transistor; and
    an initialization transistor coupled to the pass transistor, wherein the initialization transistor has a gate and a source coupled together and initializes a drain of the pass transistor.

9. The charge pump circuit as defined in claim 8, wherein the gate of the pre-charge transistor is pulled down to a negative voltage to thereby increase pre-charge efficiency.

10. The charge pump circuit as defined in claim 8, further comprising:
    a clock signal coupled to the gate of the pre-charge transistor; and
    a transistor configured as a diode having a threshold voltage coupled between the pre-charge transistor gate and source, wherein the gate of the pre-charge transistor discharges to a voltage level approximately equal to the source of the pre-charge transistor plus the threshold voltage at least partly in response to a first transition of the clock signal.

11. The charge pump circuit as defined in claim 8, further comprising:
    a second pass transistor having a source coupled to the drain of the first pass transistor;
    a charge pump stage coupled to the second pass transistor, the charge pump stage including:
        a second pre-charge transistor having a source, a gate, and a drain;
        a second discharge transistor coupled to the gate of the second pre-charge transistor, wherein the second discharge transistor selectively discharges the second pre-charge transistor;
        a third pass transistor coupled to the source of the second pre-charge transistor; and
        a second initialization transistor coupled to the second pass transistor, wherein the second initialization transistor initializes a drain of the second pass transistor.

12. A memory device, comprising:
    non-volatile memory cells;
    a charge pump coupled to the memory cells to erase the memory cells, the charge pump comprising:
        a pre-charge transistor having a source, a gate, and a drain;
        a discharge transistor coupled to the gate of the pre-charge transistor, wherein the discharge transistor selectively discharges the pre-charge transistor;
        a first pass transistor coupled to the source of the pre-charge transistor; and
        an initialization transistor coupled to the first pass transistor, wherein the initialization transistor has a gate and a source coupled together to initialize a drain of the first pass transistor.

13. The memory device as defined in claim 12, further comprising a first well, wherein the charge pump is positioned in the first well.

14. The memory device as defined in claim 12, wherein the gate of the pre-charge transistor is pulled down to a negative voltage to thereby increase pre-charge efficiency.

15. The memory device as defined in claim 12, further comprising:
- a clock signal coupled to the gate of the pre-charge transistor; and
- a transistor configured as a diode having a threshold voltage coupled between the pre-charge transistor gate and source, wherein the gate of the pre-charge transistor discharges to a voltage level approximately equal to the source of the pre-charge transistor plus the threshold voltage at least partly in response to a first transition of the clock signal.

16. The memory device as defined in claim 12, further comprising:
- a second pass transistor having a source coupled to the drain of the first pass transistor;
- a charge pump stage coupled to the second pass transistor, the charge pump stage including:
  - a second pre-charge transistor having a source, a gate, and a drain;
  - a second discharge transistor coupled to the gate of the second pre-charge transistor, wherein the second discharge transistor selectively discharges the second precharge transistor;
  - a third pass transistor coupled to the source of the second pre-charge transistor; and
  - a second initialization transistor coupled to the second pass transistor, wherein the second initialization transistor initializes a drain of the second pass transistor.

* * * * *

UNITED STATES PATENT AND TRADEMARK OFFICE
CERTIFICATE OF CORRECTION

PATENT NO. : 7,323,926 B2
APPLICATION NO. : 11/018390
DATED : January 29, 2008
INVENTOR(S) : Chen et al.

Page 1 of 1

It is certified that error appears in the above-identified patent and that said Letters Patent is hereby corrected as shown below:

At Column 4, Line 24: Delete "0.6,φf" and insert -- 0.6, φf --, therefor. (Consider space.)

At Column 4, Lines 51-54 (Approximately): Delete "Pre-charge transistor............M2 turns off." and insert the same on Line 50 (Approx.), after "ground." as a continuation of the paragraph.

At Column 6, Line 7: In Claim 8, delete "precharge" and insert -- pre-charge --, therefor.

At Column 8, Line 9 (Approximately): In Claim 16, delete "precharge" and insert -- pre-charge --, therefor.

Signed and Sealed this

Twelfth Day of August, 2008

JON W. DUDAS
*Director of the United States Patent and Trademark Office*